US012495267B2

(12) United States Patent
Lee et al.

(10) Patent No.: US 12,495,267 B2
(45) Date of Patent: Dec. 9, 2025

(54) METHOD OF RENDERING OBJECT-BASED AUDIO AND ELECTRONIC DEVICE FOR PERFORMING THE METHOD

(71) Applicant: Electronics and Telecommunications Research Institute, Daejeon (KR)

(72) Inventors: Yong Ju Lee, Daejeon (KR); Jae-hyoun Yoo, Daejeon (KR); Dae Young Jang, Daejeon (KR); Kyeongok Kang, Daejeon (KR); Soo Young Park, Daejeon (KR); Tae Jin Lee, Daejeon (KR); Young Ho Jeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 302 days.

(21) Appl. No.: 18/304,257

(22) Filed: Apr. 20, 2023

(65) Prior Publication Data

US 2023/0345197 A1 Oct. 26, 2023

(30) Foreign Application Priority Data

Apr. 22, 2022 (KR) ........................ 10-2022-0050283
Jul. 12, 2022 (KR) ........................ 10-2022-0085608
Dec. 6, 2022 (KR) ........................ 10-2022-0168824

(51) Int. Cl.
*H04S 7/00* (2006.01)

(52) U.S. Cl.
CPC .............. *H04S 7/303* (2013.01); *H04S 7/307* (2013.01); *H04S 2400/11* (2013.01); *H04S 2400/13* (2013.01)

(58) Field of Classification Search
None
See application file for complete search history.

(56) References Cited

U.S. PATENT DOCUMENTS 6,215,883 B1 * 4/2001 Leonarz .................. H04R 3/12 381/386
10,282,160 B2 5/2019 Yoo et al.
(Continued)

FOREIGN PATENT DOCUMENTS

WO 2015011055 A1 1/2015
WO WO-2021163382 A1 * 8/2021 ............. H04S 7/304

OTHER PUBLICATIONS

ISO-9613-1, Acoustics—Attenuation of sound during propagation outdoors—Part 1: Calculation of the absorption of sound by the atmosphere, First edition Jun. 1, 1993, International Organization for Standardization, Switzerland.
(Continued)

*Primary Examiner* — Qin Zhu
(74) *Attorney, Agent, or Firm* — WILLIAM PARK AND ASSOCIATES LTD.

(57) ABSTRACT

A method of rendering object-based audio and an electronic device for performing the method are disclosed. The method includes identifying metadata of the object-based audio, determining whether the metadata includes a parameter set for an atmospheric absorption effect for each distance, and rendering the object-based audio, using a distance between the object-based audio and a listener obtained using the metadata and the atmospheric absorption effect according to an effect of a medium attenuation based on the parameter, when the metadata includes the parameter.

11 Claims, 6 Drawing Sheets

(56) References Cited

U.S. PATENT DOCUMENTS

| | | | | |
|---|---|---|---|---|
| 10,440,496 | B2 | 10/2019 | De Bruijn et al. | |
| 11,146,905 | B2 | 10/2021 | Thall et al. | |
| 2012/0250870 | A1* | 10/2012 | Matthias | H04R 29/007 381/58 |
| 2019/0373395 | A1* | 12/2019 | Sarkar | H04S 7/304 |
| 2022/0014869 | A1 | 1/2022 | Lee et al. | |
| 2024/0196159 | A1* | 6/2024 | Eronen | G06F 3/012 |
| 2024/0365077 | A1* | 10/2024 | Walther | H04S 7/30 |

OTHER PUBLICATIONS

Recommendation ITU-R BS.2076-0(Jun. 2015), Audio definition Model—BS Series Broadcasting service (sound), International Telecommunication Union, Geneva, 2015.

* cited by examiner

METHOD OF RENDERING OBJECT-BASED AUDIO AND ELECTRONIC DEVICE FOR PERFORMING THE METHOD

CROSS-REFERENCE TO RELATED APPLICATIONS

This application claims the benefit of Korean Patent Application No. 10-2022-0050283 filed on Apr. 22, 2022, Korean Patent Application No. 10-2022-0085608 filed on Jul. 12, 2022, and Korean Patent Application No. 10-2022-0168824 filed on Dec. 6, 2022, in the Korean Intellectual Property Office, the entire disclosures of which are incorporated herein by reference for all purposes.

BACKGROUND

1. Field of the Invention

One or more embodiments relate to a method of rendering object-based audio and an electronic device for performing the method.

2. Description of the Related Art

Audio services have changed from mono and stereo services to 5.1 and 7.1 channels and to multi-channel services such as 9.1, 11.1, 10.2, 13.1, 15.1, and 22.2 channels that include upstream channels.

On the other hand, unlike the existing channel service, object-based audio service technology that regards one audio source as an object and stores/transmits/plays object-based audio related information such as object-based audio signals and object-based audio locations and sizes is also being developed.

The above description has been possessed or acquired by the inventor(s) in the course of conceiving the present disclosure and is not necessarily an art publicly known before the present application is filed.

SUMMARY

Embodiments provide attenuation of object-based audio by air that may be calculated, even when information, such as ambient temperature and humidity, is not given.

Embodiments provide object-based audio that may be rendered by considering an absorption effect by air by applying an attenuation rate for each frequency according to a distance when object-based audio is rendered (e.g., binaural rendering, etc.).

However, the technical aspects are not limited to the aforementioned aspects, and other technical aspects may be present.

According to an aspect, there is provided a method of rendering object-based audio including identifying metadata of the object-based audio, determining whether the metadata includes a parameter set for an atmospheric absorption effect for each distance, and rendering the object-based audio, using a distance between the object-based audio and a listener obtained using the metadata and the atmospheric absorption effect according to an effect of a medium attenuation based on the parameter, when the metadata includes the parameter.

The metadata may include a minimum distance of the object-based audio, wherein the rendering of the object-based audio may include rendering the object-based audio by applying the atmospheric absorption effect according to the distance, when the distance exceeds the minimum distance.

The parameter may include a cutoff frequency according to the distance, wherein the rendering of the object-based audio may include rendering the object-based audio according to the distance, based on the cutoff frequency.

The parameter may include a gain for each frequency band according to the distance, wherein the rendering of the object-based audio may include rendering the object-based audio according to the distance, based on the gain for each frequency band.

The method may further include rendering the object-based audio according to the distance based on an attenuation constant by predetermined air, when the metadata does not include the parameter.

According to an aspect, there is provided a method of rendering object-based audio including identifying a distance between the object-based audio and a listener and a minimum distance of the object-based audio, using metadata of the object-based audio, determining whether the metadata includes a parameter set for an atmospheric absorption effect for each distance, and rendering the object-based audio using the distance and the atmospheric absorption effect according to the parameter, when the metadata includes the parameter and the distance exceeds the minimum distance.

The parameter may include a cutoff frequency according to the distance, wherein the rendering of the object-based audio may include rendering the object-based audio according to the distance, based on the cutoff frequency.

The parameter may include a gain for each frequency band according to the distance, wherein the rendering of the object-based audio may include rendering the object-based audio according to the distance, based on the gain for each frequency band.

The method may further include rendering the object-based audio according to the distance based on an attenuation constant by predetermined air, when the metadata does not include the parameter.

According to an aspect, there is provided an electronic device including a processor, wherein the processor is configured to identify metadata including a distance between object-based audio and a listener, determine whether the metadata includes a parameter set for an atmospheric absorption effect for each distance, and render the object-based audio by applying the distance and the atmospheric absorption effect according to the parameter when the metadata includes the parameter.

The metadata may include a minimum distance of the object-based audio and the processor may be configured to render the object-based audio by applying the atmospheric absorption effect according to the distance, when the distance exceeds the minimum distance.

The parameter may include a cutoff frequency according to the distance and the processor may be configured to render the object-based audio according to the distance based on the cutoff frequency.

The parameter may include a gain for each frequency band according to the distance and the processor may be configured to render the object-based audio according to the distance based on the gain for each frequency band.

The processor may be configured to render the object-based audio according to the distance based on an attenuation constant by predetermined air, when the metadata does not include the parameter.

Additional aspects of embodiments will be set forth in part in the description which follows and, in part, will be apparent from the description, or may be learned by practice of the disclosure.

According to embodiments, attenuation of sound for each frequency according to a distance may be expressed and reproduced effectively in rendering object-based audio by considering an atmospheric absorption effect.

According to embodiments, a parameter including information about an atmospheric absorption effect for each distance may be provided as a feature of object-based audio, and an electronic device may utilize the information to process the parameter about the atmospheric absorption effect according to a distance, the atmospheric absorption effect according to the distance may be expressed and reproduced effectively.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
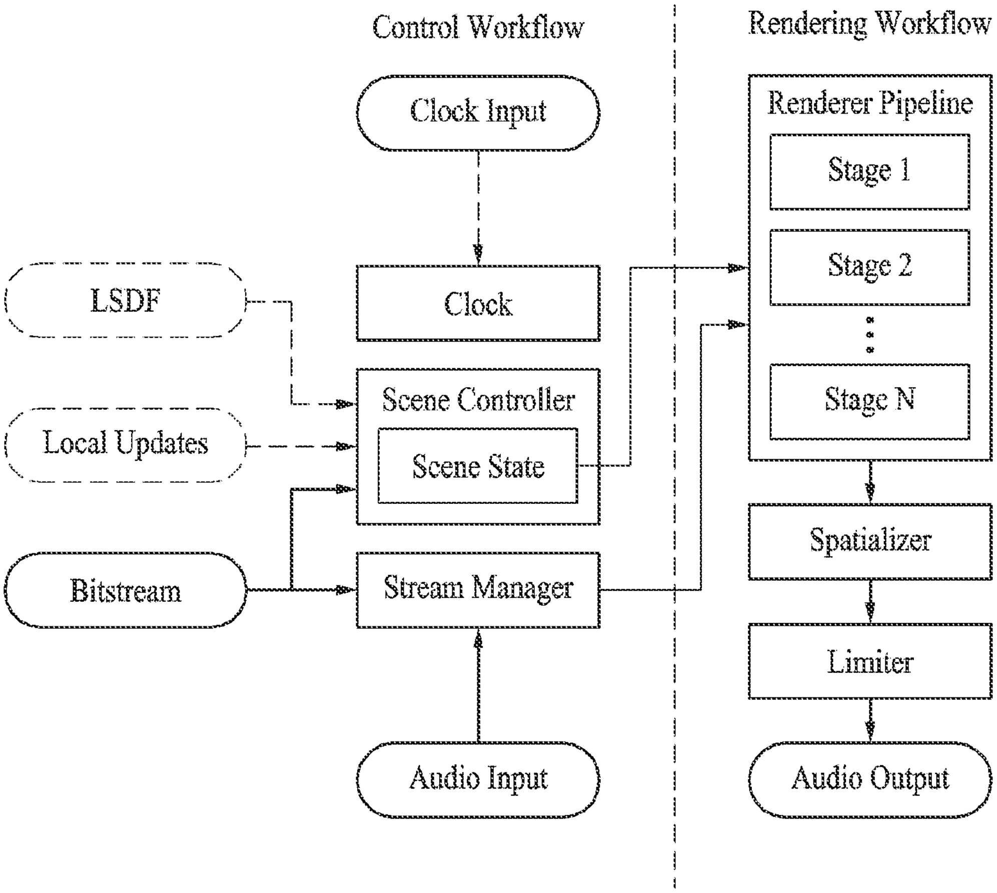
FIG. 1 is a diagram illustrating a control workflow and a rendering workflow of an electronic device according to various embodiments.

The following detailed structural or functional description is provided as an example only and various alterations and modifications may be made to embodiments. Accordingly, examples are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example, the module may be implemented in a form of an application-specific integrated circuit (ASIC).

The term "unit" or the like used herein may refer to a software or hardware component, such as a field-programmable gate array (FPGA) or an application-specific integrated circuit (ASIC), and the "unit" performs predefined functions. However, "unit" is not limited to software or hardware. The "unit" may be configured to reside on an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, the examples will be described in detail with reference to the accompanying drawings. When describing the examples with reference to the accompanying drawings, like reference numerals refer to like components and a repeated description related thereto will be omitted.

FIG. 1 is a diagram illustrating a control workflow and a rendering workflow of an electronic device according to various embodiments.

According to an embodiment, an electronic device may perform rendering object-based audio using an object-based audio signal and metadata. For example, the electronic device may refer to a renderer.

For example, the electronic device may perform real-time audioization of an audio scene having 6 degrees of freedom (DoF) in which a user may directly interact with an entity of the audio scene. The electronic device may perform rendering of virtual reality (VR) or augmented reality (AR) scenes.

In the case of VR or AR scenes, the electronic device may obtain the metadata and audio scene information from a bitstream. In the case of an AR scene, the electronic device may obtain listening space information where a user is located from a listener space description format (LSDF) file.

As shown in FIG. 1, the electronic device may output audio through a control workflow and a rendering workflow.

The control workflow is an entry point of the renderer, and the electronic device may interface with an external system and components through the control workflow. The electronic device may adjust a state of entities of the 6-DoF scene and implement an interactive interface, using a scene controller in the control workflow.

The electronic device may control a scene state. The scene state may reflect a current state of all scene objects including audio elements, transformations/anchors, and geometry. The electronic device may generate all objects of the entire scene before the rendering starts and may update to a state in which a desired scene configuration is reflected in the metadata of all objects when the playback starts.

The electronic device may provide an integrated interface for renderer components to access an audio stream connected to an audio element of the scene state, using a stream manager. The audio stream may be input as a printed circuit board (PCB) float sample. A source of the audio stream may be, for example, a decoded moving picture experts group (MPEG)-H audio stream or locally captured audio.

A clock may provide the current scene time in seconds by providing the interface for the renderer components. A clock input may be, for example, a synchronization signal from another sub-system or an internal clock of the renderer.

The rendering workflow may generate an audio output signal. For example, the audio output signal may be a pulse code modulation (PCM) float. The rendering workflow may be separated from the control workflow. The stream manager to provide the scene state and an input audio stream to transmit all changes of the 6-DoF scene may access the rendering workflow for communication between the two workflows (the control workflow and the rendering workflow).

A renderer pipeline may audioize the input audio stream provided by the stream manager, based on the current scene state. For example, the rendering may be performed along a sequential pipeline, such that individual renderer stages implement independent perceptual effects and use processing of previous and subsequent stages.

A spatializer may terminate the renderer pipeline and audioize an output of the renderer stage into a single output audio stream suitable for a desired playback method (e.g., binaural or loudspeaker playback).

A limiter may provide a clipping protection function for the audioized output signal.

Figure 2:
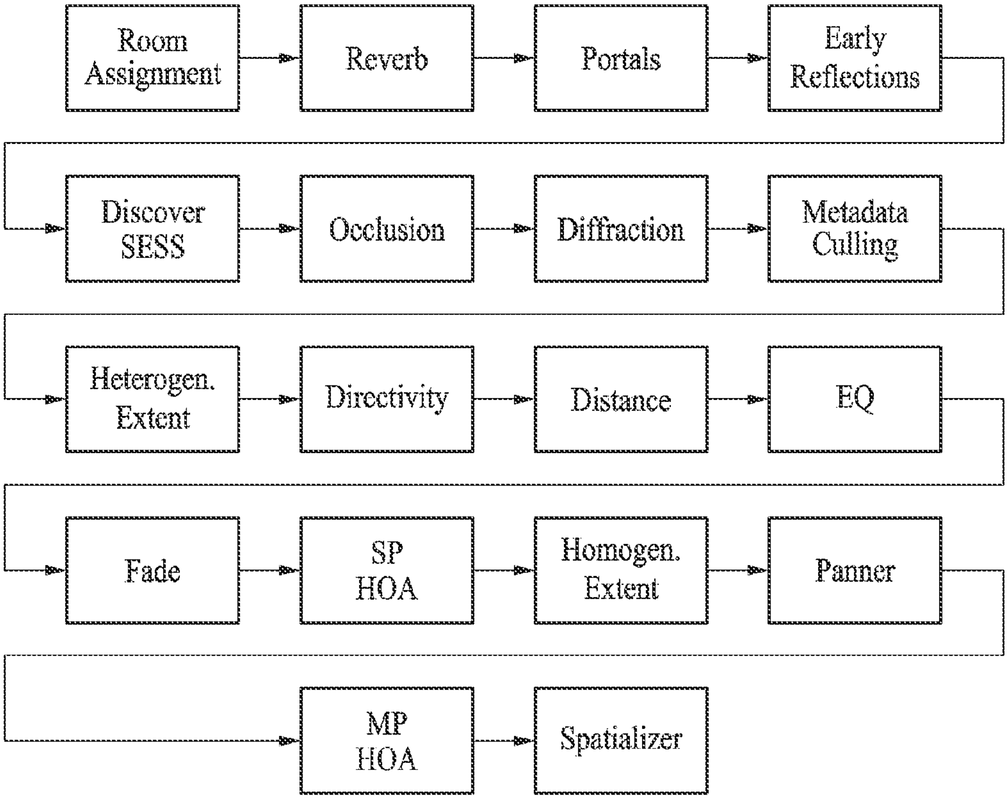
FIG. 2 is a diagram illustrating a renderer pipeline according to various embodiments.

FIG. 2 is a diagram illustrating a renderer pipeline according to various embodiments.

For example, each renderer stage of the renderer pipeline may be performed according to a set order. For example, the renderer pipeline may include stages of room assignment, reverb, portal, early reflection, discover spatially extended sound source (SESS), occlusion, diffraction, culling of the metadata, heterogeny. extent, directivity, distance, equalizer (EQ), fade, single point higher-order ambisonics (SP HOA), homogen. extent, panner, and multi point higher-order ambisonics (MP HOA).

For example, the electronic device may render a gain, propagation delay, and medium absorption of the object-based audio, according to the distance between the object-based audio and the listener in the rendering workflow (e.g., the rendering workflow of FIG. 1). For example, the electronic device may determine at least one of the gain, propagation delay, or medium absorption of the object-based audio in the distance stage of the renderer pipeline.

In the distance stage, the electronic device may calculate a distance between each render item (RI) and the listener and may interpolate a distance between update routine calls of the object-based audio stream based on a constant velocity model. The RI may refer to all audio elements in the renderer pipeline.

The electronic device may apply the propagation delay to a signal related to the RI to generate a physically accurate delay and Doppler effect.

The electronic device may model a frequency-independent attenuation of the audio element due to geometric diffusion of source energy, applying a distance attenuation. The electronic device may use a model considering the size of the audio source for the distance attenuation of a geometrically extended audio source.

The electronic device may apply the medium absorption to the object-based audio, by modeling the frequency-dependent attenuation of the audio element related to absorption features of air.

The electronic device may determine a gain of the object-based audio by applying the distance attenuation according to the distance between the object-based audio and the listener. The electronic device may apply the distance attenuation due to the geometric diffusion, using a parametric model considering the size of the audio source.

When the audio is played in the 6-DoF environment, a sound level of the object-based audio may vary depending on the distance, and the size of the object-based audio may be determined according to the 1/r law in which the size decreases in inverse proportion to the distance. For example, the electronic device may determine the size of the object-based audio according to the 1/r law in a region where the distance between the object-based audio and the listener is greater than a minimum distance and less than a maximum distance. The minimum distance and the maximum distance may refer to distances set to apply the attenuation, propagation delay, and atmospheric absorption effect according to the distance.

For example, the electronic device may identify a location of the listener (e.g., three-dimensional (3D) spatial information), a location of the object-based audio (e.g., the 3D spatial information), and the speed of the object-based audio, using the metadata. The electronic device may calculate the distance between the object-based audio and the listener, using the location of the listener and the location of the object-based audio.

The size of an audio signal transmitted to the listener may vary according to the distance between the audio source (e.g., the location of the object-based audio) and the listener. For example, in general, a sound level transmitted to the listener located at a distance of 2 meters (m) from the audio source may be less than the sound level transmitted to the listener located at a distance of 1 m from the audio source. In a free field environment, the sound level may be reduced by a ratio of 1/r (r is the distance between the object-based audio and the listener). When the distance between the audio source and the listener is doubled, the sound level heard by the listener may be reduced by about 6 decibels (dB).

The law about the attenuation of the distance and sound level may be applied to the 6-Dof VR environment. The law about the attenuation of the distance and sound level may be applied to the 6-Dof VR environment. The electronic device may use a method of decreasing the size of one object-based audio signal when the distance is far from the listener and increasing the size of one object-based audio signal when the distance is close to the listener.

For example, assuming that a sound pressure level heard by the listener is 0 dB when the listener is 1 m away from the object-based audio, when the sound pressure level is changed to −6 dB when the listener is 2 m away from the object-based audio, the listener may feel that the sound pressure naturally decreases.

For example, when the distance between the object-based audio and the listener is greater than the minimum distance and less than the maximum distance, the electronic device may determine a gain of the object-based audio according to Equation 1 below. In Equation 1, the "reference distance" may denote a reference distance and the "current distance" may denote a distance between the object-based audio and the listener. The reference distance may refer to a distance at which the gain of the object-based audio is 0 dB and may be set differently for each object-based audio. For example, the metadata may include the reference distance of the object-based audio.

$$\text{Gain [dB]} = 20\log(\text{reference distance}/\text{current distance}) \qquad \text{[Equation 1]}$$

The electronic device may determine the gain of the object-based audio by considering the atmospheric absorption effect according to the distance. A medium attenuation may correspond to a frequency-dependent attenuation of an audio source due to geometric energy diffusion. The electronic device may model the medium attenuation according to the atmospheric absorption effect by modifying an equalizer (EQ) field in the distance stage. Depending on the medium attenuation, the electronic device may apply a low-pass effect to the object-based audio that is far away from the listener.

The attenuation of the object-based audio according to the atmospheric absorption effect may be determined differently for each frequency domain of the object-based audio. For example, depending on the distance between the object-based audio and the listener, attenuation in a high frequency domain may be greater than attenuation in a low frequency domain. An attenuation rate may be defined differently depending on an environment such as temperature and humidity. When information such as temperature and humidity of an actual environment is not given or an attenuation constant by air is calculated, it is difficult to accurately reflect the attenuation according to an actual atmospheric absorption. The electronic device may apply the attenuation of the object-based audio according to the distance, using a parameter set for an atmospheric absorption effect included in the metadata.

Figure 3:
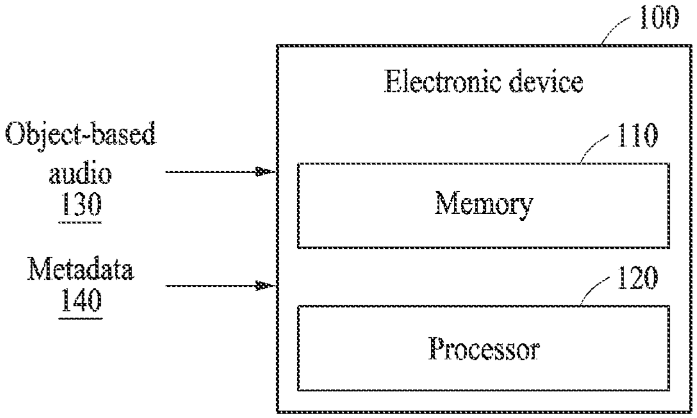
FIG. 3 is a schematic block diagram illustrating an electronic device according to various embodiments.

FIG. 3 is a schematic block diagram illustrating an electronic device 100 according to various embodiments.

Referring to FIG. 3, the electronic device 100 may include a memory 110 and a processor 120 according to various embodiments.

The memory 110 may store various pieces of data used by at least one component (e.g., a processor or a sensor module) of the electronic device 100. The various pieces of data may include, for example, software (e.g., a program) and input data or output data for a command related thereto. The memory 110 may include volatile memory or non-volatile memory.

The processor 120 may execute, for example, software (e.g., a program) to control at least one other component (e.g., a hardware or software component) of the electronic device 100 connected to the processor 120, and may perform various data processing or computation. According to an embodiment, as at least a part of the data processing or computation, the processor 120 may store a command or data received from another component (e.g., a sensor module or a communication module) in a volatile memory, process the command or the data stored in the volatile memory, and store resulting data in a non-volatile memory. According to an embodiment, the processor 120 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with the main processor. For example, when the electronic device 100 includes a main processor and an auxiliary processor, the auxiliary processor may be adapted to consume less power than the main processor or to be specific to a specified function. The auxiliary processor may be implemented separately from the main processor or as a part of the main processor.

Regarding operations described below, the electronic device 100 may perform the operations using the processor 120. For example, the electronic device 100 may identify object-based audio 130 and metadata 140 using the processor 120 and determine the gain of the object-based audio 130. In another example, the electronic device 100 may further include a separate module (not shown) or block (not shown) for determining the gain (or volume, volume level, sound level) of the object-based audio 130 according to the distance. For example, the electronic device 100 may further include a renderer (not shown) for rendering the object-based audio 130, and the renderer of the electronic device 100 may render the object-based audio 130 using the object-based audio 130 and the metadata 140.

Referring to FIG. 3, the electronic device 100 according to various embodiments may identify the metadata 140. The metadata 140 may include information related to the object-based audio 130. For example, the metadata 140 may include at least one of the 3D location information, volume information, minimum distance information, maximum distance information, or the parameter related to the atmospheric absorption effect for each distance of the object-based audio 130, or a combination thereof.

The electronic device 100 may determine whether the metadata 140 includes the parameter set for the atmospheric absorption effect for each distance.

The size of an audio signal transmitted to the listener may be determined according to the audio source location (e.g., the 3D location information of the object-based audio 130 included in the metadata 140) of the object-based audio 130 and the location of the listener. For example, the size of the audio signal may be determined according to the distance between the object-based audio 130 and the listener.

The size of the audio signal transmitted to the listener may decrease as the distance between the object-based audio 130 and the listener increases due to the size attenuation of sound.

The size of the audio signal attenuated according to the distance may be different for each frequency. For example, when the distance between the audio source and the listener is 15 m, an attenuation rate of a low frequency may be less than an attenuation rate of a high frequency. For example, when the distance between the audio source and the listener is 30 m, an attenuation rate of a specific frequency may be greater than when the distance is 15 m. The size of the audio signal attenuated according to the distance may be different for each frequency according to the atmospheric absorption effect.

When the metadata 140 includes the parameter, the electronic device 100 may render the object-based audio 130 by applying the distance and the atmospheric absorption effect according to the parameter. For example, rendering the object-based audio 130 using the distance may represent rendering the object-based audio 130 by applying the attenuation according to the distance to the object-based audio 130. For example, rendering the object-based audio 130 using the atmospheric absorption effect may represent rendering the object-based audio 130 by applying the atmospheric absorption effect to the object-based audio 130. The electronic device 100 may obtain the distance between the object-based audio 130 and the listener using the metadata 140. For example, the electronic device 100 may calculate the distance between the object-based audio 130 and the listener, using the location of the listener and the 3D location information of the object-based audio 130.

For example, when the electronic device 100 provides a VR environment or a metaverse environment, the electronic device 100 may identify the location of the listener in a virtual space. The electronic device 100 may calculate the distance between the object-based audio 130 and the listener, using the location of the listener and the 3D location information of the object-based audio 130 in the virtual space.

For example, the parameter set for the atmospheric absorption effect for each distance may include a cutoff frequency according to the distance. The electronic device 100 may apply the atmospheric absorption effect according to the distance between the object-based audio 130 and the listener, using the cutoff frequency according to the distance. The electronic device 100 may render the object-based audio 130 by applying the atmospheric absorption effect according to the distance. For example, the electronic device 100 may determine a gain for each frequency component of the object-based audio 130 based on the cutoff frequency.

TABLE 1

```
< Atmospheric Absorption number = “6”>
    <Distance d = “50.0”   Cut off Frequency fc = “20000.0” />
    <Distance d = “100.0”   Cut off Frequency fc = “10000.0” />
    <Distance d = “200.0”   Cut off Frequency fc = “5000.0” />
    <Distance d = “400.0”   Cut off Frequency fc = “2500.0” />
    <Distance d = “800.0”   Cut off Frequency fc = “1000.0” />
    <Distance d =“1600.0”   Cut off Frequency fc = “500.0” />
</Atmospheric Absorption>
```

Table 1 may show an example of the parameter including the cutoff frequency according to the distance. In Table 1, “Atmospheric Absorption” may denote a parameter related to the atmospheric absorption effect for each distance. Table 1 may show the cutoff frequency according to the distance when a value of the parameter is set to “6”.

For example, Table 1 may show that the cutoff frequency (e.g., “Cut off Frequency fc” in Table 1) may be 20,000 hertz (Hz), when the parameter value is “6” and the distance (e.g., “Distance” in Table 1) between the object-based audio 130 and the listener is 50 m. Table 1 may show that the cutoff frequencies are set to 10,000 Hz, 5,000 Hz, 2,500 Hz, 1,000 Hz, and 500 Hz, respectively, when the parameter is to “6” and the distances between the object-based audio 130 and the listener are 100 m, 200 m, 400 m, 800 m, and 1,600 m, respectively.

As shown in Table 1, the parameter according to an embodiment may include the cutoff frequency according to the distance. The electronic device 100 may render the object-based audio 130 using the distance and the cutoff frequency. For example, when the parameter is “6” and the distance is 50 m, the electronic device 100 may filter a frequency component of 20,000 Hz or more among frequency components of the object-based audio 130.

For example, the electronic device 100 may render the object-based audio 130 according to the distance using the set parameter as shown in Table 1. For example, Table 1 may show the cutoff frequency set according to the distance section. For example, Table 1 may show that the cutoff frequency is set to 20,000 Hz in a section where the distance exceeds 0 m and is less than 50 m, when the parameter is set to “6”.

For example, when the distance exceeds 0 m and is less than 50 m, the electronic device 100 may render the object-based audio 130 using the cutoff frequency of 20,000 Hz. For example, when the distance exceeds 50 m and less than 100 m, the electronic device 100 may render the object-based audio 130 using the cutoff frequency of 10,000 Hz.

For example, the parameter set for the atmospheric absorption effect for each distance may include the gain for each frequency band according to the distance. The electronic device 100 may apply the atmospheric absorption effect according to the distance between the object-based audio 130 and the listener, using the gain for each frequency band according to the distance. The electronic device 100 may render the object-based audio 130 by applying the atmospheric absorption effect according to the distance. For example, the electronic device 100 may determine a gain for each frequency component of the object-based audio 130 based on the gain for each frequency band according to the distance.

TABLE 2

```
<Atmospheric Absorption number = “3”>
  <Distance d = “50.0” >
    <Frequency f = “125.0”   gain = “1.00” />
    <Frequency f = “250.0”   gain = “0.95” />
    <Frequency f = “500.0”   gain = “0.90” />
    <Frequency f = “1000.0”   gain = “0.85” />
    <Frequency f = “2000.0”   gain = “0.80” />
    <Frequency f = “4000.0”   gain = “0.75” />
  </Distance>
  <Distance d = “100.0” >
    <Frequency f = “125.0”   gain = “1.00” />
    <Frequency f = “250.0”   gain = “0.90” />
    <Frequency f = “500.0”   gain = “0.80” />
    <Frequency f = “1000.0”   gain = “0.70” />
    <Frequency f = “2000.0”   gain = “0.60” />
    <Frequency f = “4000.0”   gain = “0.50” />
  </Distance>
  <Distance d = “200.0” >
    <Frequency f = “125.0”   gain = “1.00” />
    <Frequency f = “250.0”   gain = “0.85” />
    <Frequency f = “500.0”   gain = “0.70” />
    <Frequency f = “1000.0” gain = “0.55” />
    <Frequency f = “2000.0” gain = “0.40” />
    <Frequency f = “4000.0” gain = “0.25” />
  </Distance>
</Atmospheric Absorption>
```

Table 2 may show an example of the gain for each frequency band according to the distance. In Table 2, “Atmospheric Absorption” may denote a parameter related to the atmospheric absorption effect for each distance. Table 2 may show the gain for each frequency band according to the distance when the value of the parameter is set to “3”.

For example, Table 2 may show that each gain is set to "1.00", "0.95", "0.90", "0.85", "0.80", and "0.75" when the frequencies of the object-based audio 130 are 125 Hz, 250 Hz, 500 Hz, 1,000 Hz, 2,000 Hz, and 4,000 Hz, respectively, in case that the value of the parameter is "3" ("Atmospheric Absorption number"="3" in Table 2) and the distance between the object-based audio 130 and the listener is 50 m (e.g., "Distance d"="50.0" in Table 2). When the value of the parameter is "3" and the distances are 100 m and 200 m, respectively, substantially the same description as when the distance is 50 m may be applied.

For example, the electronic device 100 may render the object-based audio 130 according to the distance using the set parameter as shown in Table 2. For example, Table 2 may show the gain for each frequency band set according to the distance section. For example, Table 2 may show that a gain of the frequency band exceeding 0 Hz and less than 125 Hz is set to 1.00 when the parameter is "3" and the distance exceeds 0 m and is less than 50 m.

Referring to Table 1 and/or Table 2 above, the electronic device 100 may determine the gain of the object-based audio 130 according to the distance for each frequency band of the object-based audio 130 or may determine the size at which the object-based audio 130 attenuates.

For example, when the metadata 140 does not include the parameter set for the atmospheric absorption effect for each distance, the electronic device 100 may render the object-based audio 130 according to the distance, based on the attenuation constant by predetermined air.

For example, the electronic device 100 may render the object-based audio 130 by applying the atmospheric absorption effect according the distance, as shown in Equation 2 below.

$$\delta L_t(f)=10\ lg(p_i^2/p_t^2)\ \text{dB}=\alpha s \qquad \text{[Equation 2]}$$

In Equation 2, f may denote a frequency of the object-based audio 130, $\delta L_t$ may denote attenuation due to an atmospheric absorption effect, $p_i$ may denote an initial sound pressure amplitude, $p_t$ may denote a sound pressure amplitude, α may denote a pure-tone sound attenuation coefficient, and s may denote a distance through which a sound propagates. In Equation 2, the pure-tone sound attenuation coefficient α may denote an attenuation constant by predetermined air.

For example, the electronic device 100 may render the object-based audio 130 by applying the atmospheric absorption effect according to the distance and the parameter. For example, the electronic device 100 may perform processing according to a frequency response for the object-based audio 130, using the distance and the parameter. For example, the electronic device 100 may perform processing according to the distance on the frequency component of the object-based audio 130. For example, the electronic device 100 may determine the gain according to the distance for each frequency component.

For example, the electronic device 100 may generate a finite impulse response (FIR) by reflecting a frequency response feature according to the distance based on a parameter. The electronic device 100 may perform processing according to the frequency response on the object-based audio 130 by convoluting a signal of the object-based audio 130 with an FIR filter.

For example, the electronic device 100 may transform the signal of the object-based audio 130 in the time domain into the signal of the object-based audio 130 in the frequency domain, using a fast Fourier transform (FFT). The electronic device 100 may generate the frequency response feature based on the parameter included in the metadata 140. The electronic device 100 may perform processing according to the frequency response on the object-based audio 130 by multiplying the signal of the object-based audio 130 converted into the frequency domain with the generated frequency response feature.

The medium attenuation may describe a frequency dependent attenuation of the audio source due to the geometric energy diffusion. The medium attenuation may include the atmospheric absorption effect for each distance.

For example, the electronic device 100 may model the effect due to the medium attenuation by modifying the EQ field in the rendering stage of the object-based audio 130. The electronic device 100 may calculate a value of the EQ field for modeling the effect of the medium attenuation, using a set parameter. For example, the electronic device 100 may calculate the value of the EQ field for modeling the effect of the medium attenuation, using the cutoff frequency for each distance included in the parameter and/or the gain according to the distance for each frequency band.

The electronic device 100 may generate the low-pass effect with respect to the audio element (e.g., the object-based audio 130) that is far from the listener by modeling the effect of the medium attenuation. For example, the low-pass effect may refer to the same effect as passing the signal of the audio element through a low-pass filter (LPF).

For example, when the metadata 140 does not include the parameter, the electronic device 100 may calculate the value of the EQ field for modeling the effect of the medium attenuation, using an local configuration parameter such as band center frequency, temperature, and humidity, and atmospheric pressure, and the like.

Figure 4:
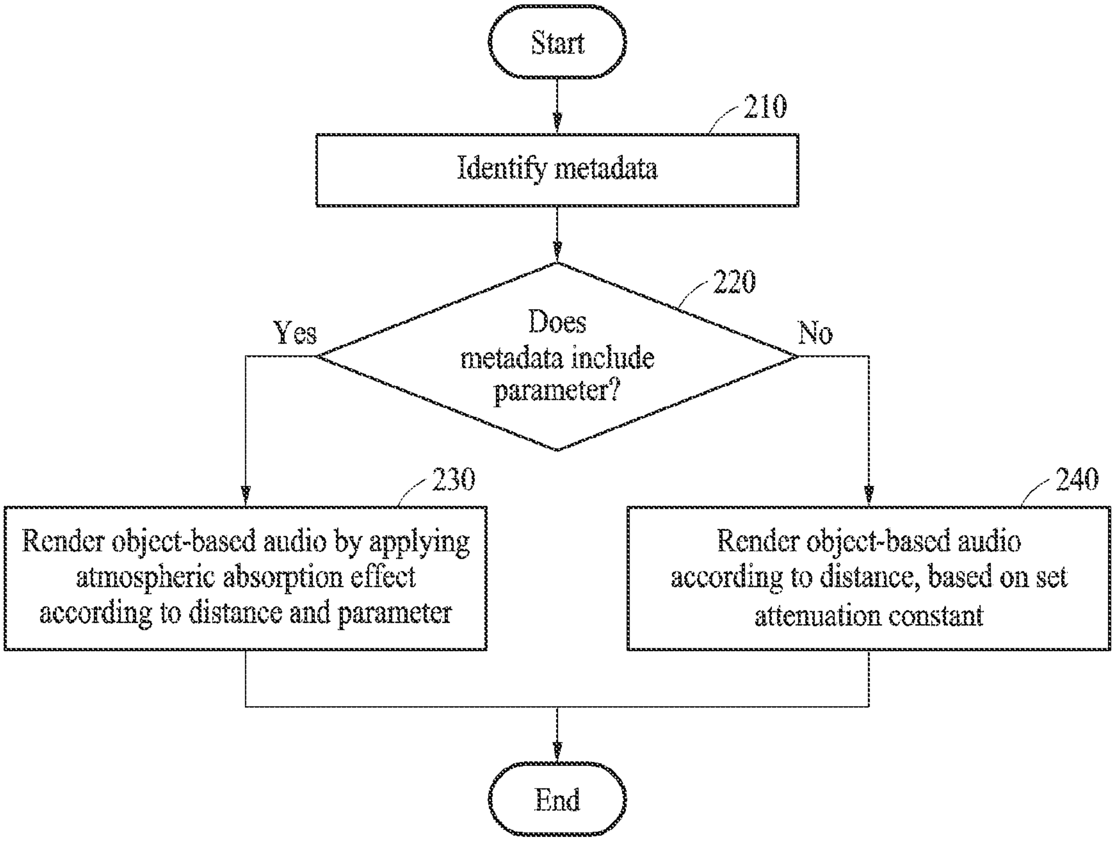
FIG. 4 is a flowchart illustrating a method of rendering object-based audio according to various embodiments.

FIG. 4 is a flowchart illustrating a method of rendering the object-based audio 130 according to various embodiments.

Referring to FIG. 4, in operation 210, the electronic device 100 may identify the metadata 140. For example, the metadata 140 may include at least one of the 3D location information, the volume information, the minimum distance information, the maximum distance information, or the atmospheric absorption effect for each distance of the object-based audio 130, or a combination thereof.

The electronic device 100 may identify the location of the listener. The electronic device 100 may identify the distance between the listener and the object-based audio 130. For example, the electronic device 100 may calculate the distance between the listener and the object-based audio 130, using the location of the listener and the 3D location information of the object-based audio 130.

In operation 220, the electronic device 100 may determine whether the metadata 140 includes the parameter set for the atmospheric absorption effect for each distance.

In operation 230, the electronic device 100 may render the object-based audio 130 by applying the atmospheric absorption effect according to the distance and the parameter, when the metadata 140 includes the parameter set for the atmospheric absorption effect for each distance.

For example, when the parameter includes the cutoff frequency according to distance, the electronic device 100 may render the object-based audio 130 based on the cutoff frequency. For example, as shown in Table 1, the cutoff frequency may be set for each distance according to the value of the parameter. Among the frequency components of the object-based audio 130, the electronic device 100 may determine a gain of the frequency component greater than or equal to the cutoff frequency as "0" and a gain of the frequency component less than the cutoff frequency as "1". For example, the electronic device 100 may render the object-based audio 130 as when the signal of the object-based audio 130 is applied to the LPF, using the cutoff frequency.

When the metadata 140 does not include the parameter set for the atmospheric absorption effect for each distance, the electronic device 100 may render the object-based audio 130 according to the distance, based on a set attenuation constant in operation 240. For example, the electronic device 100 may determine the size at which the object-based audio 130 attenuates, using the attenuation constant as shown in Equation 2. The electronic device 100 may render the object-based audio 130 using the size at which the object-based audio 130 attenuates.

Figure 5:
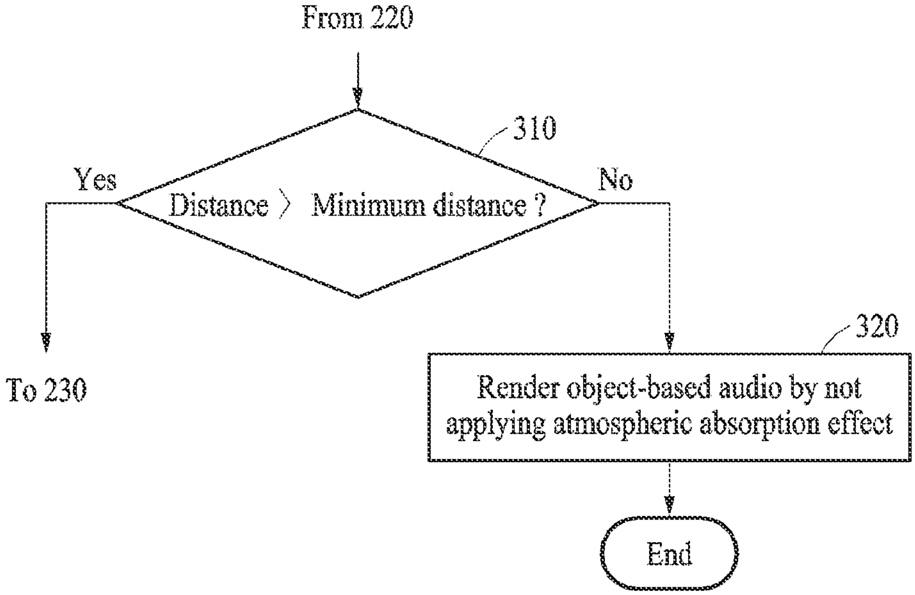
FIG. 5 is a diagram illustrating an operation of rendering object-based audio based on a minimum distance according to various embodiments.

FIG. 5 is a diagram illustrating an operation of rendering the object-based audio 130 based on a minimum distance according to various embodiments.

In operation 310, the electronic device 100 may determine whether the distance between the listener and the object-based audio 130 exceeds the minimum distance included in the metadata 140. The minimum distance may refer to a distance to which the attenuation by the distance is applied. The attenuation by the distance may include the atmospheric absorption effect according to the distance.

For example, when the distance between the listener and the object-based audio 130 exceeds the minimum distance, the electronic device 100 may apply the attenuation by the distance to the object-based audio 130. When the distance between the listener and the object-based audio 130 is less than or equal to the minimum distance, the electronic device 100 may not apply the attenuation by the distance to the object-based audio 130.

In operation 320, the electronic device 100 may not apply the atmospheric absorption effect according to the distance to the object-based audio 130 and may render the object-based audio 130, when the distance between the listener and the object-based audio 130 is less than or equal to the minimum distance included in the metadata 140.

Figure 6:
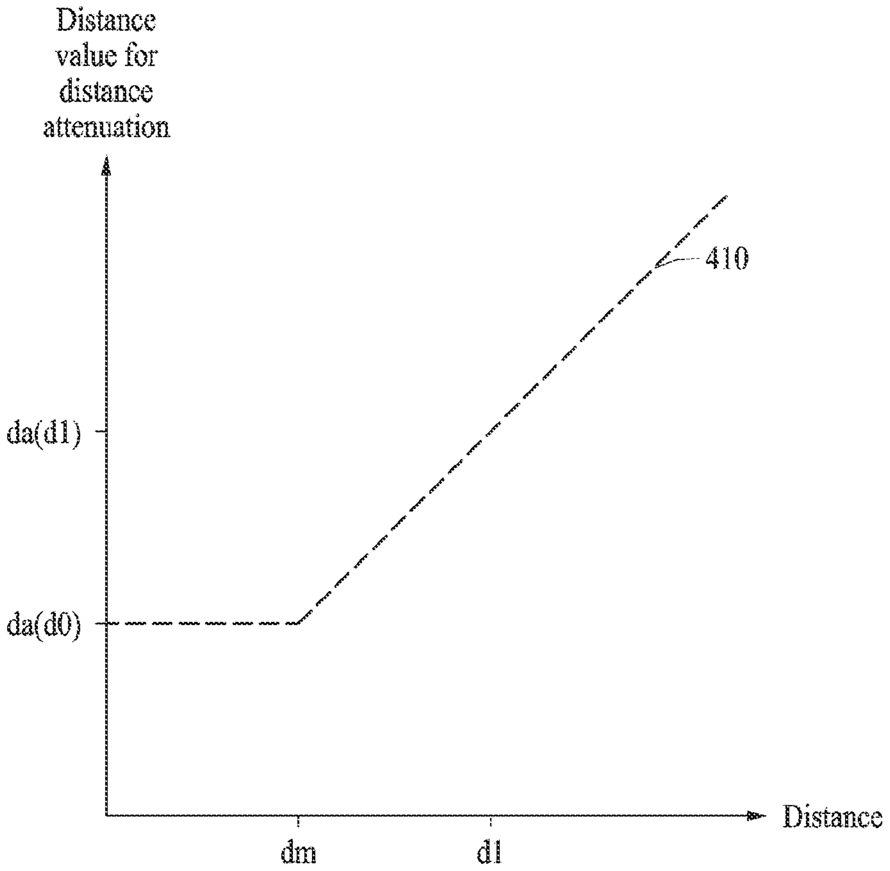
FIG. 6 is a diagram illustrating a distance for applying an atmospheric absorption effect based on a minimum distance according to various embodiments.

FIG. 6 is a diagram illustrating a distance for applying an atmospheric absorption effect based on a minimum distance according to various embodiments.

The horizontal axis of the graph shown in FIG. 6 may represent the distance between the listener and the object-based audio 130 and the vertical axis may represent a distance value for applying the attenuation by the distance.

Referring to FIG. 6, when the distance is less than or equal to the minimum distance (e.g., dm in FIG. 6), the distance value may be determined as a set value (e.g., da(d0) in FIG. 6). As shown in FIG. 6, when the distance is less than or equal to the minimum distance, the electronic device 100 may calculate the distance value with the set value, may not apply the atmospheric absorption effect according to the distance to the object-based audio 130, and may render the object-based audio 130. When the distance is less than or equal to the minimum distance, the electronic device 100 may render the object-based audio 130 by applying the atmospheric absorption effect to the object-based audio 130 according to the set distance value.

The electronic device 100 may determine the attenuation due to the geometric diffusion and the attenuation due to the atmospheric absorption effect, using the distance value shown in FIG. 6. The electronic device 100 may render the object-based audio 130 by considering the attenuation due to the geometric diffusion and/or the attenuation due to the atmospheric absorption effect.

Figure 7:
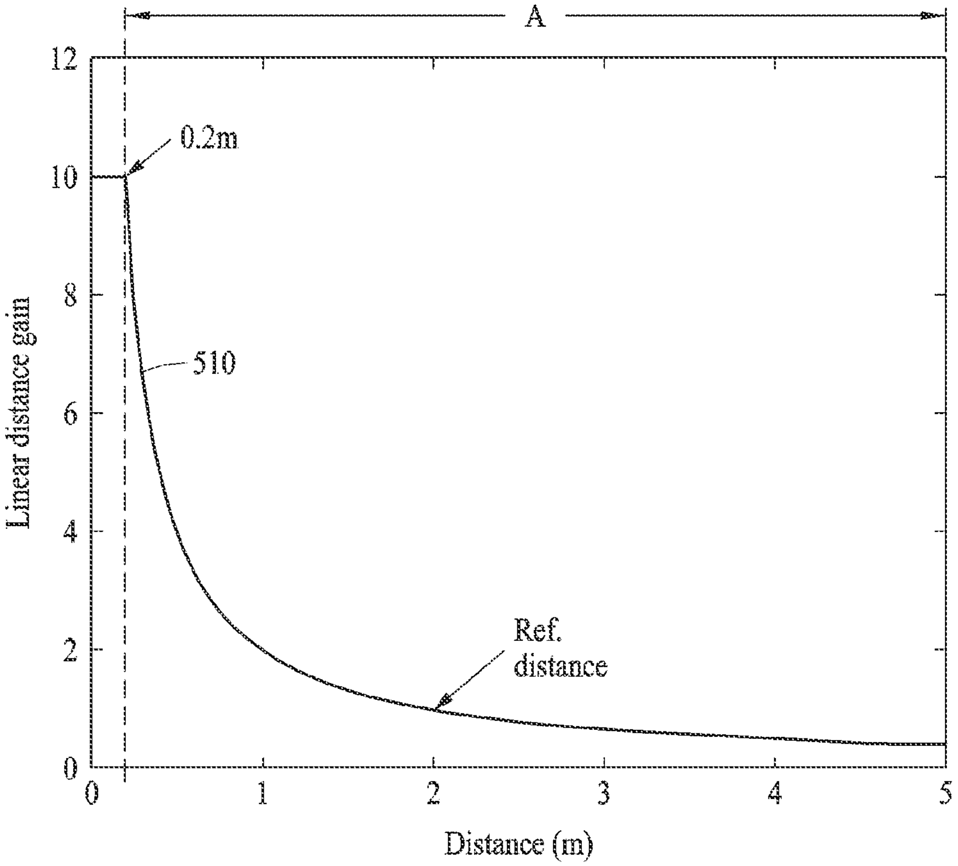
FIG. 7 is a diagram illustrating a gain according to a distance of a rendered object-based audio according to various embodiments.

FIG. 7 is a diagram illustrating a gain according to a distance of the rendered object-based audio 130 according to various embodiments.

FIG. 7 is a diagram illustrating the gain (e.g., the linear distance gain in FIG. 7) of the object-based audio 130 according to the distance (e.g., the distance in FIG. 7). Referring to FIG. 7, the electronic device 100 may render the object-based audio 130 by considering the minimum distance. When the distance between the listener and the object-based audio 130 is less than or equal to the minimum distance (e.g., 0.2 m), the electronic device 100 may determine the gain of the object-based audio 130 by not applying the attenuation according to the distance. The attenuation according to the distance may include the attenuation due to the geometric diffusion of the object-based audio 130 and the attenuation due to the atmospheric absorption effect.

For example, when the distance is less than or equal to the minimum distance, the electronic device 100 may determine the distance value for applying the attenuation according to the distance as the set value, as shown in FIG. 6. When the distance is less than or equal to the minimum distance, the electronic device 100 may determine the distance value as the set value and determine the gain of the object-based audio 130 as shown in FIG. 7. When the distance is less than or equal to the minimum distance, the size of the attenuation by the distance may be constant because the distance value is constant as the set value even when the distance changes. That is, when the distance is less than or equal to the minimum distance, the electronic device 100 may determine the distance value for the attenuation by the distance and may render the object-based audio 130 by not applying the attenuation by the distance to the object-based audio 130.

In FIG. 7, area A may represent a distance section to which the attenuation by the distance is applied. In area A of FIG. 7, the electronic device 100 may apply the attenuation according to the geometric diffusion of the object-based audio 130 and/or the attenuation due to the atmospheric absorption effect to the object-based audio 130, using the distance value shown in FIG. 6. In area A where the distance exceeds the minimum distance, the electronic device 100 may determine the gain of the object-based audio 130 by considering the attenuation according to the geometric diffusion of the object-based audio 130 and/or the attenuation due to the atmospheric absorption effect. The electronic device 100 may render the object-based audio 130 using the determined gain.

The examples described herein may be implemented using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device may also access, store, manipulate, process, and create data in response to execution of the software. For purpose of simplicity, the description of a processing device is singular; however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or one or more combinations thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the examples may be recorded in non-transitory computer-readable media including program instructions to implement various operations of the examples. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

Although the examples have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

What is claimed is:

1. A method of rendering object-based audio, the method comprising:

identifying metadata of the object-based audio;

determining whether the metadata comprises a parameter set for an atmospheric absorption effect for each distance;

rendering the object-based audio, using a distance between the object-based audio and a listener obtained using the metadata and the atmospheric absorption effect according to an effect of a medium attenuation based on the parameter and a cutoff frequency according to the distance comprised in the parameter, when the metadata comprises the parameter; and rendering the object-based audio according to the distance based on an attenuation constant by predetermined air, when the metadata does not comprise the parameter.

2. The method of claim 1, wherein the metadata comprises a minimum distance of the object-based audio, wherein the rendering of the object-based audio comprises rendering the object-based audio by applying the atmospheric absorption effect according to the distance, when the distance exceeds the minimum distance.

3. The method of claim 1, wherein the rendering of the object-based audio comprises rendering the object-based audio according to the distance based on the cutoff frequency.

4. The method of claim 1, wherein the parameter comprises a gain for each frequency band according to the distance, wherein the rendering of the object-based audio comprises rendering the object-based audio according to the distance based on the gain for each frequency band.

5. A method of rendering object-based audio, the method comprising:

identifying a distance between the object-based audio and a listener and a minimum distance of the object-based audio, using metadata of the object-based audio;

determining whether the metadata comprises a parameter set for an atmospheric absorption effect for each distance;

rendering the object-based audio using the distance and the atmospheric absorption effect according to the parameter and a cutoff frequency according to the distance comprised in the parameter, when the metadata comprises the parameter and the distance exceeds the minimum distance; and rendering the object-based audio according to the distance based on an attenuation constant by predetermined air, when the metadata does not comprise the parameter.

6. The method of claim 5, wherein the rendering of the object-based audio comprises rendering the object-based audio according to the distance based on the cutoff frequency.

7. The method of claim 5, wherein the parameter comprises a gain for each frequency band according to the distance, wherein the rendering of the object-based audio comprises rendering the object-based audio according to the distance based on the gain for each frequency band.

8. An electronic device comprising:

a processor, wherein the processor is configured to:

identify metadata comprising a distance between object-based audio and a listener;

determine whether the metadata comprises a parameter set for an atmospheric absorption effect for each distance;

render the object-based audio by applying the distance and the atmospheric absorption effect according to the parameter and a cutoff frequency according to the distance comprised in the parameter, when the metadata comprises the parameter; and render the object-based audio according to the distance based on an attenuation constant by predetermined air, when the metadata does not comprise the parameter.

9. The electronic device of claim 8, wherein the metadata comprises a minimum distance of the object-based audio, and the processor is configured to render the object-based audio by applying the atmospheric absorption effect according to the distance, when the distance exceeds the minimum distance.

10. The electronic device of claim 8, wherein the processor is configured to render the object-based audio according to the distance based on the cutoff frequency.

11. The electronic device of claim 8, wherein the parameter comprises a gain for each frequency band according to the distance, and the processor is configured to render the object-based audio according to the distance based on the gain for each frequency band.

* * * * *